United States Patent Office 3,031,575
Patented Apr. 24, 1962

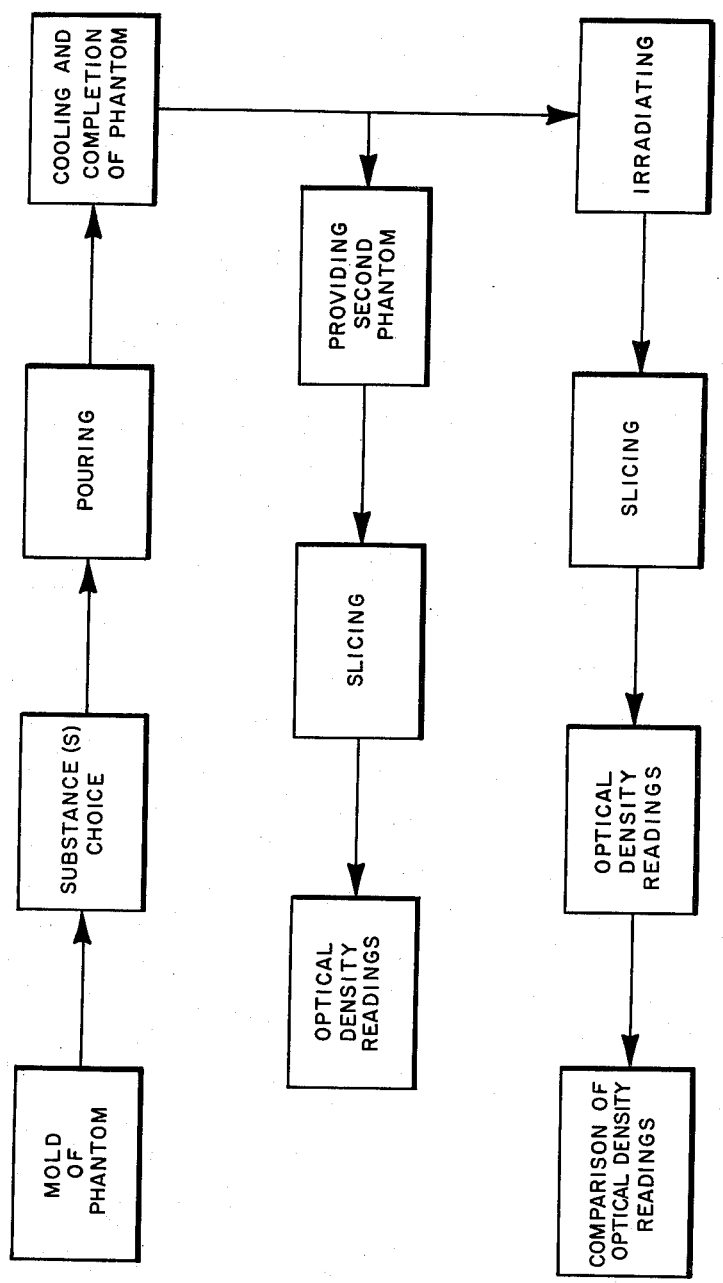

3,031,575
METHOD AND MEANS OF MEASURING RADIATION TRI-DIRECTIONALLY
Lewis H. Gevantman, San Mateo, and James F. Pestaner, Berkeley, Calif., assignors to the United States of America as represented by the Secretary of the Navy
Filed Apr. 30, 1958, Ser. No. 732,105
2 Claims. (Cl. 250—83)
(Granted under Title 35, U.S. Code (1952), sec. 266)

The invention described herein may be manufactured and used by or for the Government of the United States of America for governmental purposes without the payment of any royalties thereon or therefor.

This invention relates to measurement of absorbed radiation and particularly to the absorbed energy or dose distributed within a body.

Various means and methods are utilized to measure radiation flux impinging a body and the distribution of energy which is absorbed therein. With the atomic age and other means for effecting radiation came consideration of the biological effects within a radiation impinged body and the distribution thereof to internal organs. Hence, many techniques or methods have been developed. Those methods presently used involve various mechanisms and steps, such a tissue-dose computer which determines the depth-dose from inverse square law considerations and known absorption coefficients. Another involves integrating the indication of dose of a plurality of ionization chambers, preferably positioned so the radiation striking and leaving a phantom is recorded. Yet another involves isodose recorders having a servo mechanism which forces a detector, such as an ion chamber or scintillator counter, to follow a contour within a liquid or gaseous phantom. Still another involves adding a dye to a gel thereby determining radiation dose by color changes. Films have also been used to indicate the amount of radiation impinging a body in a specific area. A still further method involves the freezing of samples and irradiating them in the frozen or crystalline state so they can be examined with a spectrometer to observe the paramagnetic resonance absorption lines.

A disadvantage of some of the previous methods is that only the amount of ionization was measured rather than the distribution of the energy absorbed. Also, the particular geometry of the body being examined may not be adaptable for energy distribution studies. In addition, in many instances the liquids and other substances used for fabricating the simultaed body or phantom being examined is difficult to duplicate. Further, the range of energy under consideration may be critically limited since the reaction, of the material of the fabricated body or phantom, to the radiation may be so small up to a particular energy level that a chemical product for producing a record is insufficient. Another disadvantage is the material used, such as films, may not be tissue equivalent and results are misleading due to the lack of accuracy.

Since physiological effects within irradiated bodies have ben the subject of evaluation, the accurate measurement of dose at a particular depth, namely depth-dose, has also been sought. Such depth-dose is a function of four variables, namely, depth, backscatter, target-surface distance (TSD), and the absorber or body itself. Mathematical equations and experiments indicate energies of depth-dose diminish with the extent of penetration and are therefore difficult to predict. Backscatter is dependent upon the means for obtaining the beam, namely the voltage and filtration of the beam, and the nature of the source. The distance from the source of radiation to the surface of the absorbing body will affect the depth-dose, and since much of the radiation will be scattered, the TSD effects will not vary in accordance with the inverse square law. The absorbing body possesses the stopping or absorbing power, or Z, and is defined as tissue equivalent. Sometimes the Z of a material varies considerably depending upon the region of energy under study. Hence, the energy distribution in terms of depth-dose is difficult to predict, and calculate, where the stress for accuracy is prevalent.

Therefore, a primary object of this invention is to provide an accurate and otherwise satisfactory molded article and method for investigating the tri-dimensional distribution of absorbed radiations producing chemical products in irradiated materials, thereby indicating the dose or energy absorbed.

Another object is to provide a molded article and method for directly determining the magnitude of absorbed energy distribution of radiation in a body and over a comparatively wide range of energy.

Still another object is to provide a method for determining the energy or dose distribution within a tissue equivalent body or phantom being radiated where the geometry thereof may be of any specific arrangement.

Yet another object is to provide a method for providing a phantom which may be duplicated for purposes of examination.

According to the invention a molded article and method is provided for indicating the energy or dose distribution of absorbed radiations impinging a body. This is accomplished by providing a simulated body or phantom made of a mixture of gel and radiation sensitive chemical that undergoes changes in optical density when impinged by an irradiating beam and the mixture is then sectioned and its optical density in a plane normal to the irradiating beam is determined by a photometer and the density variation from that of an unirradiated corresponding section is recorded. When the section is taken along a plane where the distribution of irradiation is to be determined, such variation in optical density is directly indicative of the energy or dose so absorbed and distributed in that plane thusly penetrated. The radiation sensitive chemical employed reflects the product distribution pattern, and hence, the choice of such chemical is an important feature of this invention since the chemical product is directly indicative of the absorbed energy as distributed within the phantom. The mixture or chemical, along with any dyes incorported therein, is of such nature and so clearly determined that the phantom's geometry may not only be duplicated for examination purposes but provided to any specific arrangement.

The nature of this invention as well as other objects and advantages thereof will be more readily apparent from consideration of the following specification.

The drawing shows a block diagram of the invention with the steps of the invention shown in sequence.

Reference to the drawing will show the various sequential steps of the invention which will determine the distribution of radiating energy that is incident upon a simulated body or phantom. The first step involves the mold of the phantom which comprises the provision of a mold having simulated geometrical characteristics of the actual body under study. The second step involves the choosing of a proper chemical substance or substances that have the equivalent Z or stopping power as that of the actual body under study. If a substance such as a hot gel is utilized for this purpose the gel is poured into the mold and then permitted to cool or otherwise stiffen. This step of cooling may be coupled with the provision of glass or the like to simulate bones, for example, within the structure. The steps of providing a second phantom, slicing the phantom in accordance with the slicing of an irradiated phantom to be discussed subsequently, and the taking of optical density readings by using a microphotometer, amount to no more than the provision of readings so a comparison of optical densities may be available. However, the unirradiated phantom is of little value without a molded phantom which is irradiated and sliced in a manner in keeping with the study involved. It should be understandable that the unirradiated phantom would of necessity have to be sliced in a manner in accordance with the slicing of the irradiated phantom. The optical density readings of the irradiated sliced phantom is then taken, preferably with a microphotometer, since such renders greater accuracy, and the last step involves comparison of the optical densities taken from the two readings. The various steps involved will be more readily understandable upon reading the subsequent discussion.

The instant method involves several steps that contribute to the ultimate goal of determining the distribution of absorbed energy or dose within a body. First, the particular size and shape or geometry of the object under consideration is determined so the phantom, which is governed in varying degrees by the object under study, may be constructed. It is then necessary to choose a chemical substance or mixture that may be a firm aqueous gel made of a gelling substance, radiation sensitive chemical, and suitable color indicator which in some manner indicates a change upon irradiation, and in this instance a substance or system that undergoes changes in optical density. Subsequent to the determination of chemical substance and geometry, the phantom is molded accordingly and irradiated. The irradiated mixture is then sectioned along various planes normal to the longitudinal axis of the impinging irradiation beam and a section thereof is positioned in a photometer for measurement of its present optical density and compared with the optical density of a corresponding portion of unirradiated mixture. Such comparison permits the ratio of optical density to be known which is recorded on a suitable indicator of a photometer calibrated by the prior use of a dosimeter or energy indicator of a corresponding impinging radiation so as to directly indicate the amount of absorbed energy or dose and its distribution.

Basically, the geometry of the object under study is simulated by a phantom whose geometry is generally governed accordingly and made of a material having a stopping, or absorbing power, or Z, simulating corresponding parts. For example, if the object being examined is man, the various portions of the phantom resembling the organs, bones, etc., are made of material having as nearly the same Z as possible, the value being available since such have long since been known. For example, the Z of glass and bones is similar. The geometry of the phantom is governed to some extent by the actual geometry of the object being studied. If only a portion of the object is under study no purpose is served in molding the whole phantom of the same chemical substance since only that portion need be irradiated. The choice of the chemical substance, mixture, or system, is significant. Fundamentally, it should have the characteristic of indicating energy transfer by a reaction product effected by impinging radiation. An important feature of this invention is that a system having chemicals that undergo changes in optical density be used.

The gel for the system is chosen for its solubility in water, firmness, relative inertness to radiation and chemical products created by radiation, and ease of handling. A suitable gel having these characteristics is chosen for incorporation in a suitable radiation sensitive chemical. Various highly viscous materials may be employed for this purpose including agar, N,N'-difenzoyl cystine, and gelatin. Agar is preferably used since it is relatively inactive toward other ingredients of the system to be discussed subsequently.

Choice of the radiation sensitive chemical is based on its high radiation sensitivity, high thermal stability, absorption in the visible and near ultraviolet energy regions, and should follow the Beer-Lambert law of light absorption. The effect of radiation on various chemicals in solution or other states is known and a laborious study along with extensive experiments indicate that potassium iodide and trichloroethylene in combination with suitable color indicators are both quite effective. In respect to potassium iodide, sodium glycolate of amlopectin may be employed as a color indicator. The change in such a chemical and indicator incorporated in a gel and liquid is from colorless to a deep blue effected by the radiation-induced oxidation of iodine. The trichloroethylene is incorporated with a dye indicator, preferably bromcresol purple. The radiation on such chemical resulting in a change of color from purple to yellow is caused by the production of HCl therein. The absorbing power or Z of the system may be altered by the concentration of radiation sensitive chemical incorporated in the gel and liquid.

The mixture having potassium iodide therein may consist by weight of 1% agar, 1% potassium iodide and 0.15% indicator and 97.85% water. The trichloroethylene mixture may involve by weight 1% agar, 0.1% trichloroethylene, 10 to the minus 3 power percent indicator, and 98.9% water.

The mixture is prepared in a convenient manner. For example, in the trichloroethylene mixture, 1 gram of agar is mixed in 95 grams of distilled water, heated and stirred to 90 degrees centigrade until dissolved. Two ml. of a 1 mg./ml. solution of bromcresol purple are added. The solution is stirred until the dye is uniformly dispersed and thus removed from the bath. Then 250 microliters of trichloroethylene and 1 ml. of 0.02 M HCl are added. The latter is for the purpose of adjusting the initial pH of the mixture to 7.0 plus or minus 0.1. The solution is weighted, brought to proper weight with distilled water, stirred and cooled to about 70 degrees centigrade. It may then be poured into a container or phantom mold where it can cool slowly to room temperature and gel. Hastening of the cooling procedure should be avoided to prevent optical density variations in the gel.

The source for irradiating the phantom gel is of a suitable type such as a constant potential X-ray machine of 250 kvp. or a Van de Graaff generator (2 mev.) and the phantom is firmly held therein for irradiation.

After irradiation the phantom is sectioned normal to the longitudinal axis of the radiating beam which involves removing the gel mold from the irradiating source and positioning in a sectioning mechanism that firmly supports the gel so the thickness or thinness of the severed section or slice may be controlled. Hence, a device is utilized which incrementally advances the gel toward or away from the path of the cutting plane, or, the slicing mechanism has its cutting plane moved incrementally. The slicing element should provide a thin cut in the gel, as by a 3 mil stainless steel wire.

After sectioning the phantom into a chosen number of sample slices, their optical density is examined at planes normal to the longitudinal axis of the impinging radiation beam. The type of examining mechanism employed, such as a photometer, is considered an important feature of this invention. A spectrophotometer, or preferably a microphotometer which measures the distribution of energy and dose far more easily, is used. Some basic changes may be chosen to be made in the microphotometer, such as using a large light source for increasing its intensity which is beamed through a focusing lens into a condensing microscope. The beam is filtered to a narrow band near 5600 Angstroms and collimated by an 8-mil slit before entering the remaining optical system. Upon traversing a first microscope the beam passes through the sample where its dimensions are small, such as 0.4 mm. by 0.8 mm. Upon emergence from the sample the beam passes into another focusing microscope and is again collimated before entering a photocell for effecting an electrical signal which is amplified and recorded on an indicator, such as a chart. The sample is held on a movable stage having any one of six speeds which is synchronized with the chart speed of the recorder. The distribution pattern may be continuously scanned along the horizontal axis of the sectioned gel and at suitable intervals, such as 1 mm, along the vertical.

Before or after measuring the optical density of the irradiated gel, a non-irradiated portion of the gel or blank, corresponding to a section of the irradiated gel, has its optical density measured by the microphotometer. The change of optical density is obtained by subtracting the blank from the irradiated value and the microphotometer may be calibrated against another instrument at chosen intervals to insure reproducibility of the measurements. It is these measurements that makes it possible to obtain a determination of the distribution of radiation in a body tri-directionally. By this, namely tri-directionally, is meant the distance or angle and depth the radiation has traveled into the phantom, or simulated body, from a plane normal to the particular point and which is below the surface where the radiation was incident. In other words, the term tri-directionally refers to the usual and well-known X, Y and Z coordinates, and hence, the fact that an impinging radiating beam is refracted will not prevent its travel and distribution from being determined.

To provide a criteria of the value of the change in optical density, an indicator of energy or dose is positioned within the container when no mold of gel is therein. The same irradiating source is applied within the empty container and the dose or energy reading is taken which in turn is used to calibrate the indicator of the microphotometer to correspond with the change of optical density value of the irradiated and blank gel.

In practice, this invention provides a method for directly and tri-directionally determining the extent of energy or dose absorbed by a body or object when impinged by radiation. First, the object's geometry is determined and a container or mold is obtained for making a phantom whose geometry and tissue equivalent is in accordance with the body being studied. Therefore the phantom is of any specific geometry and easily duplicated. A chemical system that forms a reaction product to radiation induced therein, thereby bringing about a change in optical density, is used to indicate the distribution and absorption of energy or dose of impinging radiation. Thus, an aqueous gel is chosen which is a combination gel, a choice between radiation sensitive chemicals with color indicators, all mixed at high temperature and poured into the phantom mold. The hot gel slowly cools to room temperature, and removed from the mold and positioned in a source for irradiation where it remains stationary, rotates, or otherwise moves, in accordance with the demands of the experiment. The phantom is immediately removed from the irradiating source and positioned in a slicer for sectioning in planes normal to the longitudinal axis of the irradiating beam. An optical density reading of the sectioned phantom is taken by placing each slice in a microphotometer which has a movable platform and optical system that closely scans the optical absorption by the sectioned gel. Hence, the distribution of energy or dose may be measured tri-directionally and the range of energy or dose which may be measured extends between 500 to 30,000 rads (100 ergs absorbed per gram). Then another phantom is molded, slowly cooled to room temperature and sectioned in a manner corresponding to the sectioning of the irradiated phantom. An optical density reading of the blank or unirradiated gel is taken and the difference between that and the irradiated gel reading is calculated. Such difference is due to the change in optical density effected by the radiation-induced color change reaction product within the gel. An energy indicator or dosimeter is positioned in the empty container, which is positioned before the irradiating source and the radiation utilized to irradiate the phantom is used to calibrate the microphotometer recorder in accordance with the difference of the optical densities. The microphotometer is checked against another instrument to insure reproducible results.

It should be understood, of course, that the foregoing specification related only to preferred embodiments of the invention and it is intended to cover all changes and modifications of the examples of the invention herein chosen for the purposes of disclosure, which do not constitute departures from the spirit and scope of the invention.

Obviously many modifications and variations of the present invention are possible in the light of the above teachings. It is therefore to be understood that within the scope of the appended claims the invention may be practiced otherwise than as specifically described.

What is claimed is:

1. A molded article for use in a process of tri-directionally measuring the radiant energy absorption of a particular biological body portion in which process the molded article is irradiated then sectioned and optically analyzed; the molded article comprising a phantom body portion geometrically and structurally simulating said particular biological body portion and formed of a liquid gel mixture having a radiation-stopping capability closely approximating that of said particular biological body portion tissue, said mixture being formed of 1% by weight agar, 1% by weight potassium iodide, a color indicator, and the balance water.

2. A molded article for use in a process of tri-directionally measuring the radiant energy absorption of a particular biological body portion in which process the molded article is irradiated then sectioned and optically analyzed; the molded article comprising a phantom body portion geometrically and structurally simulating said particular biological body portion and formed of a liquid gel mixture having a radiation-stopping capability closely approximating that of said particular biological body portion tissue, said mixture being formed of 1% by weight agar, 1% by weight trichloroethylene, a color indicator, and the balance water, said mixture further having its pH adjusted to 7.0 plus or minus 0.1.

References Cited in the file of this patent
UNITED STATES PATENTS

| | | |
|---|---|---|
| 2,596,080 | Raper | May 6, 1952 |
| 2,722,519 | Otley et al. | Nov. 1, 1955 |
| 2,752,506 | Fitzgerald et al. | June 26, 1956 |
| 2,830,969 | Zoubek | Apr. 15, 1958 |
| 2,882,414 | Joyner | Apr. 14, 1959 |

OTHER REFERENCES

Effect of Gamma Radiation on Certain Rubbers and Plastics, by Ryan, Nucleonics, vol. 11, No. 8, August 1953, pp. 13 to 15.